United States Patent
Bailey (10) Patent No.: US 9,952,484 B2
(45) Date of Patent: Apr. 24, 2018

(54) PHOTOGRAPHIC BACKGROUND ASSEMBLY

(71) Applicant: MANFROTTO UK LIMITED, Richmond Surrey (GB)

(72) Inventor: Matthew Bailey, Coalville Leicestershire (GB)

(73) Assignee: MANFROTTO UK LIMITED, Richmond, Surrey (GB)

( * ) Notice: Subject to any disclaimer, the term of this patent is extended or adjusted under 35 U.S.C. 154(b) by 0 days.

(21) Appl. No.: 15/036,717

(22) PCT Filed: Nov. 12, 2014

(86) PCT No.: PCT/EP2014/074413
§ 371 (c)(1),
(2) Date: May 13, 2016

(87) PCT Pub. No.: WO2015/071332
PCT Pub. Date: May 21, 2015

(65) Prior Publication Data
US 2016/0299408 A1  Oct. 13, 2016

(30) Foreign Application Priority Data

Nov. 18, 2013  (GB) .................................. 1320340.1

(51) Int. Cl.
*G03B 15/06* (2006.01)

(52) U.S. Cl.
CPC .................................. *G03B 15/06* (2013.01)

(58) Field of Classification Search
None
See application file for complete search history.

(56) References Cited

U.S. PATENT DOCUMENTS 3,827,021 A * 7/1974 Phelon .................... A47J 47/16
                                                             248/309.4
6,411,778 B1   6/2002 Peterson
(Continued)

FOREIGN PATENT DOCUMENTS

CN      200941142 Y    8/2007
DE       20020126 U1   2/2001
(Continued)

OTHER PUBLICATIONS

Avonpicturethis "How to hang Photo backgrounds and backdrops", YouTube video dated Oct. 21, 2017, https://www.youtube.com/watch?v=gQqRtJ9JC2rca.*

*Primary Examiner* — Clayton E Laballe
*Assistant Examiner* — Leon W. Rhodes, Jr.
(74) *Attorney, Agent, or Firm* — Volpe and Koenig, P.C.

(57) ABSTRACT

A photographic background assembly, comprises a collapsible background unit having a semi-rigid frame, and a background mounting member. The collapsible background unit comprises a magnetic portion, and the background mounting member comprises at least one magnetic receiving formation configured to engage the magnetic portion of the collapsible background unit, such that the collapsible background unit is selectively attachable to the background mounting member by the magnetic portion so as to provide a background for use in photography.

15 Claims, 4 Drawing Sheets

(56) References Cited

U.S. PATENT DOCUMENTS

| | | | | |
|---|---|---|---|---|
| 6,604,844 B2* | 8/2003 | Hussey | ................... | E04H 15/28 135/147 |
| 6,659,620 B2* | 12/2003 | Goto | ...................... | A47B 97/00 362/11 |
| 2013/0329287 A1* | 12/2013 | Zarelius | .............. | G09F 15/0062 359/443 |

FOREIGN PATENT DOCUMENTS

| | | | |
|---|---|---|---|
| GB | 2352434 | A | 1/2001 |
| GB | 2442018 | A | 3/2008 |
| WO | 2006060399 | A2 | 6/2006 |

\* cited by examiner

PHOTOGRAPHIC BACKGROUND ASSEMBLY

TECHNICAL FIELD

The present invention relates to the field of photographic apparatus, and in particular relates to a photographic assembly for providing a background for an object being photographed.

TECHNOLOGICAL BACKGROUND

In the field of photography, the use of backgrounds is popular for a wide variety of reasons. Photographers often wish to photograph objects against a featureless background, thereby focussing attention towards the object being photographed. Furthermore, the use of a background allows a photographer to manipulate light, so as to better illuminate the object to be photographed.

From a commercial point of view, backgrounds are beneficial to photographers as they facilitate the provision of a wide variety of options to a client. Furthermore, backgrounds allow a photographer to vary the nature of a photograph, and may be utilised in a wide variety of locations, for example in the studio, at a client's home, or on location.

Conventional backgrounds often comprise rigid panels and/or flexible sheets, each of which have their associated problems. Rigid panels are not easily portable, and both rigid panels and flexible sheets are time consuming to erect and mount, as well as being difficult to maintain in position.

Collapsible backgrounds are known in the field of photography, and their use is becoming ever increasingly popular. Whilst collapsible backgrounds are generally portable, and relatively easy to assemble, they remain difficult to mount and/or support. Photographers are often required to purchase a stand that is specifically designed to hold a support for a background, and actually attaching a background to such a support can prove to be time consuming and cumbersome. Freestanding collapsible backgrounds are also known, yet are often unstable and prone to unwanted movement during use.

It is therefore an objective of present invention to provide a system which at least partially mitigates one or more of the aforementioned problems.

SUMMARY OF THE INVENTION

According to a first aspect of the invention, there is provided a photographic background assembly, the assembly comprising a collapsible background unit having a semi-rigid frame, and a background mounting member, wherein the collapsible background unit comprises a magnetic portion, and wherein the background mounting member comprises at least one magnetic receiving formation configured to engage the magnetic portion of the collapsible background unit, such that the collapsible background unit is selectively attachable to the background mounting member by the magnetic portion so as to provide a background for use in photography.

The photographic background assembly is advantageous principally because of the combination of a collapsible background unit having a semi-rigid frame, and a background mounting member having at least one magnetic receiving formation configured to engage a magnetic portion of the collapsible background unit. The assembly according to the invention may therefore be readily collapsible and erectable, and may be of simple construction.

By "collapsible" is meant that the background unit is reducible in size, most preferably by at least 50%, along at least one dimension.

The collapsible background unit may be adapted to inherently retain its shape, at least when suspended from its upper end, during normal use.

The collapsible background unit may have the form of a generally planar panel, which may have any shape suitable for use as a background, but is typically generally rectangular. The collapsible background unit may include at least one operative surface adapted to act as a photographic background, and the operative surface may be defined by one side of a collapsible background unit having the form of a generally planar panel. The operative surface may be smooth in form, and may have a uniform coloration and/or pattern across its extent.

The collapsible background unit may comprise a flexible sheet portion, within the semi-rigid frame, which may be more flexible than the semi-rigid frame. At least one side of the flexible sheet portion may define the operative surface of the collapsible background unit, and each side of the flexible sheet portion may define alternative operative surfaces of the collapsible background unit.

The flexible sheet portion may be held in tension in order to remove any creases or wrinkles when assembled. The flexible sheet portion may be formed of a fabric, for example a woven or knitted fabric. However, in order to facilitate the removal of creases and wrinkles from the flexible sheet portion, the flexible sheet portion may be formed of an elastic material, such as a knitted fabric, which may be held in tension by the semi-rigid frame. Furthermore, the flexible sheet portion may have a smooth external surface, and therefore may include a plastics coating on an operative surface. The plastics coating may be smooth in form.

A semi-rigid frame may be located at, and may extend along, the periphery of the flexible sheet portion. The semi-rigid frame may be resilient. The semi-rigid frame may comprise one or more elongate frame members, which may be housed in a fabric sleeve. The one or more frame members may be formed into a hoop, such that the ends of the one or more frame members are joined together.

The semi-rigid frame and the flexible sheet portion may be fixed together. The semi-rigid frame and the flexible sheet portion may be permanently fixed together. The semi-rigid frame and the flexible sheet portion may be fixed together by sewing, gluing, stapling, or any other like method.

The semi-rigid frame may have the form of a resilient hoop. In one embodiment, the flexible sheet portion is provided with a peripheral tube within which a resilient hoop is accommodated, the hoop serving to tension the flexible sheet portion in a shape that is determined by the shape of the flexible sheet portion. The semi-rigid frame may be formed of a band of resilient material, eg a flat strip of resilient material. The band may be formed in a metal, such as steel. The band may have a width of between 5 mm and 15 mm, and where the band is formed in metal, may have a thickness of between 0.5 and 2 mm. The peripheral tube may be connected to the flexible sheet portion by sewing.

The collapsible background unit may be collapsible without the need to disengage any components of the collapsible background unit from each other. The collapsible background unit may be collapsible by deforming the semi-rigid frame. The collapsible background unit may be adapted to be collapsible by bending, twisting and/or folding. The semi-rigid frame may therefore be resilient, such that the collapsible background unit may be restored to its operative shape following collapse. Where the collapsible background unit comprises a semi-rigid frame and a flexible sheet portion, and the semi-rigid frame has the form of a resilient band of material, the collapsible background unit may be adapted to be collapsed by the user grasping opposite sides of the semi-rigid frame, twisting the semi-rigid frame to form loops, and then folding those loops over, such that the loops lie adjacent to each other, and then repeat where possible. The collapsible background unit may then be stored in a pouch or other receptacle until it is next required.

By "magnetic portion" of the collapsible background unit is meant a portion of the collapsible background unit that is attracted to a permanent magnet. The magnetic portion may therefore by any suitable ferromagnetic or ferrimagnetic material, such as steel.

The magnetic portion of the collapsible background unit may comprise a single magnetic mount, eg an elongate magnetic member, or may comprise a plurality of discrete magnetic mounts. These one or more magnetic mounts may be fixed to the remainder of the collapsible background unit, eg fixed to the semi-rigid frame, or may include fasteners, such that the one or more magnetic mounts are mounted to the collapsible background unit during assembly.

Alternatively, the magnetic portion may be formed by one or more portions of the semi-rigid frame of the collapsible background unit. The collapsible background unit may therefore not include any separate mounts, eg magnetic mounts including fasteners, with the magnetic portion forming an inherent part of the semi-rigid frame. At least a portion of the semi-rigid frame, eg on one side of the frame, may be formed of a magnetic material. The semi-rigid frame may be formed of one or more members, at least one of which is formed of a magnetic material. In one embodiment, substantially the entire semi-rigid frame is formed of a magnetic material.

The magnetic portion of the collapsible background unit may have an engagement surface shaped to mate with an engagement surface of the at least one magnetic receiving formation. In one embodiment, the engagement surfaces of the collapsible background unit and the magnetic receiving formation are substantially flat.

The background mounting member may form part of a self-supporting stand, or may be fixed to a permanent structure, eg a wall of a studio. Where the background mounting member forms part of a self-supporting stand, the stand may be collapsible. The collapsible stand may therefore comprise one or more members that are movable relative to each other, eg hingedly or telescopically mounted relative to each other.

The background mounting member may be adapted to be selectively attachable to at least one side of the collapsible background unit. The background mounting member may be adapted to be selectively attachable to two or more sides of the collapsible background unit, or the photographic background assembly may comprise a plurality of background mounting members. In one embodiment, the photographic background assembly has one or more background mounting members adapted to be selectively attachable to an upper portion of the collapsible background unit, such that the collapsible background unit is suspended from that upper portion when the photographic background assembly is assembled. For example, the one or more background mounting members of the photographic background assembly may be adapted to be selectively attachable to an upper portion of the collapsible background unit only, when the photographic background assembly is assembled.

The background mounting member may be disposed in the proximity of an upper end of a self-supporting stand. In one embodiment, the background mounting member is adapted to be selectively attachable to an upper portion of the collapsible background unit. The at least one magnetic receiving formation of the background mounting member may be orientated to receive the magnetic portion of the collapsible background unit from below, eg receiving an upper end of the collapsible background unit.

The at least one magnetic receiving formation of the background mounting member may comprise one or more permanent magnets, which retain sufficient magnetism to attract and retain the magnetic portion of the collapsible background unit. The one or more permanent magnets may be formed of a suitable ferromagnetic or ferrimagnetic material, which retains its magnetism, eg neodymium. The strength of the at least one magnetic receiving formation of the background mounting member may be selected to enable the collapsible background unit to be securely supported by the one or more permanent magnets only, during use, but also enable a user to manually remove the collapsible background unit from the background mounting member, when desired. The at least one magnetic receiving formation of the background mounting member may have a strength in the region of 0.01-0.5 Tesla.

The background mounting member may include guide surfaces, which guide the magnetic portion of the collapsible background unit into engagement with the at least one magnetic receiving formation of the background mounting member. The guide surfaces may have inclined surfaces, which provide one or more tapered guides to the at least one magnetic receiving formation of the background mounting member. The guide surfaces may or may not be formed of a magnetic material, and hence form part of the at least one magnetic receiving formation.

The guide surfaces may be formed by one or more housings for the at least one magnetic receiving formation, which may be formed of a different material to the material of at least one magnetic receiving formation, eg a non-magnetic material. In one embodiment, the guide surfaces define a channel, with open ends and inclined side surfaces, which receive an elongate magnetic portion of the collapsible background unit.

The background mounting member may also include retaining formations, which resist movement of the collapsible background unit by non-magnetic means, when it is attached to the background mounting member, in at least one dimension. The retaining formations may complement the action of the at least one magnetic receiving formation of the background mounting member. In one embodiment, the at least one magnetic receiving formation of the background mounting member suspends the collapsible background unit, with retaining formations of the background mounting member resisting lateral movement, eg linear or rotational movement.

The retaining formations may be formed by one or more housings for the at least one magnetic receiving formation, which may be formed of a different material to the at least one magnetic receiving formation, eg non-magnetic material. In one embodiment, the retaining formations define a channel, with open ends and inclined side surfaces, which receive an elongate magnetic portion of the collapsible background unit.

The guide surfaces and the retaining formations may be defined by the same component, eg by one or more housings for the at least one magnetic receiving formation. However, retaining formations that are remote from the at least one magnetic receiving formation may be provided.

The background mounting member may be substantially elongate in form, such that the background mounting member resembles a bar, or rod, or the like. The background mounting member may have a substantially circular cross-section. A magnetic receiving formation may be located at either end of the background mounting member. Alternatively, a single magnetic receiving formation may extend substantially along the entirety of the background mounting member.

The background mounting member may be orientated generally horizontally during use. The background mounting member may comprise a plurality of arms. Each arm may comprise a magnetic receiving formation. The arms may be orientated at an oblique angle relative to each other.

The background mounting member may comprise a mount for attachment to a support member of a stand. The stand mount may be located in a central region of the background mounting member. The stand mount may depend from the arms of the background mounting member. The stand mount may be adapted to receive a support member of the stand, eg an upright support member, and may be substantially cylindrical in form. The stand mount may comprise a fastening formation. The fastening formation may be used to fasten the stand mount to a support member of the stand.

DESCRIPTION OF THE DRAWINGS

A practicable embodiment of the invention is described in further detail below with reference to the accompanying drawings, of which.

PREFERRED EMBODIMENT OF THE INVENTION

Figure 1:
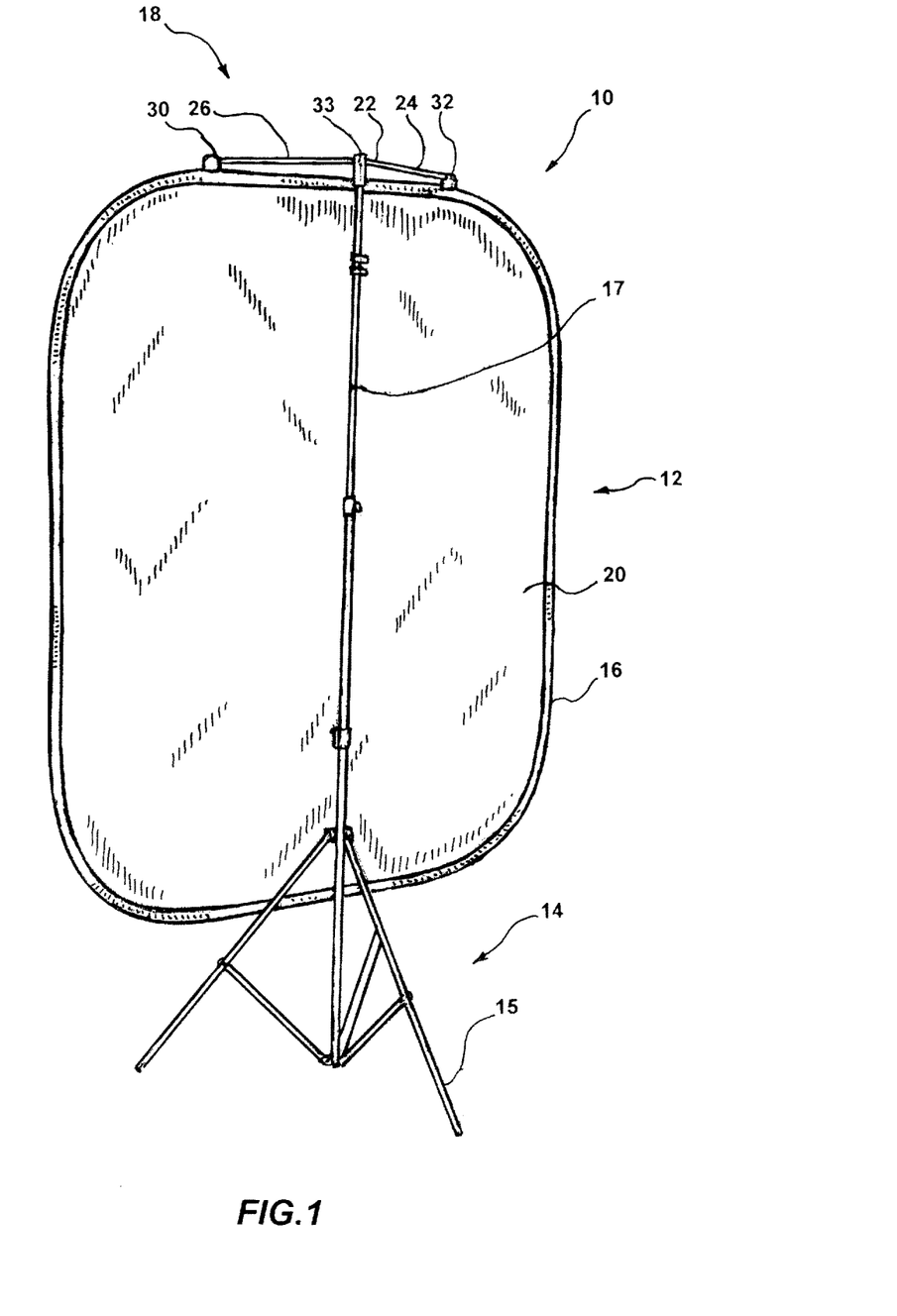
FIG. 1 is a perspective view of a photographic background assembly according to the invention.
Figure 2:
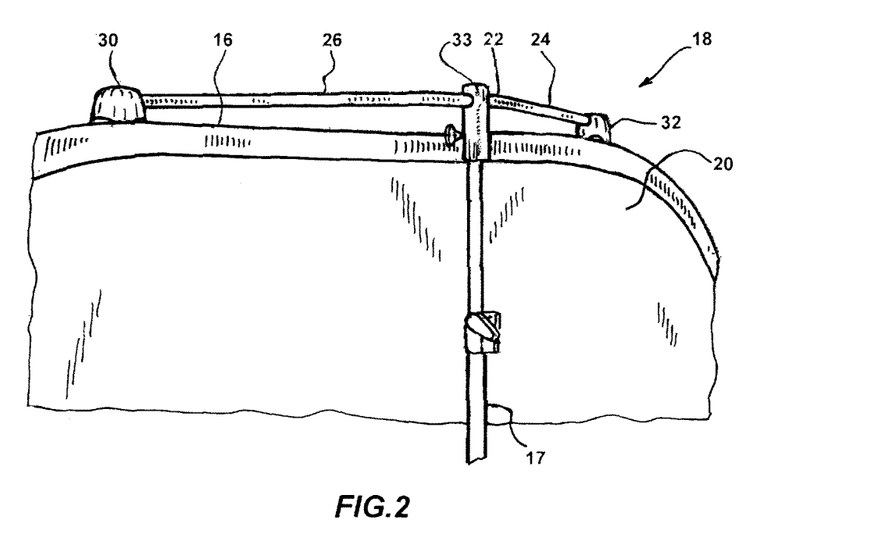
FIG. 2 is a close-up perspective view of an upper portion of the photographic background assembly of FIG. 1.

With reference to FIG. 1, there is shown a photographic background assembly, generally designated 10, according to the present invention. The photographic background assembly 10 comprises a collapsible background unit 12, and a stand 14.

In this embodiment of the present invention, the collapsible background unit 12 is substantially rectangular in form, with curved vertices, yet other shapes of collapsible background are envisaged and not excluded from the scope of the present application.

The collapsible background unit 12 comprises a semi-rigid frame 16 and a fabric sheet 20. The semi-rigid frame 16 is formed of a band of carbon spring steel, formed into a hoop, and housed within a fabric sleeve stitched to the periphery of the fabric sheet. The semi-rigid frame is therefore magnetic in nature, forming the magnetic portion of the collapsible background unit 12. Furthermore, as the carbon spring steel is resilient in nature, the semi-rigid frame 16 allows the collapsible background unit 12 to be deformed and retained in a resiliently biased closed configuration, when not in use. The semi-rigid frame 16 extends around the entirety of the perimeter of the collapsible background unit 12.

The fabric sheet 20 is attached to, and extends across the semi-rigid frame 16. The fabric sheet 20 is made from a resilient and flexible material, which is a knitted material with a reflective, plastics coating in this embodiment. The fabric sheet 20 is therefore collapsible. The fabric sheet 20 may have a surface of any colour and/or pattern, such that the fabric sheet 20 provides a background suitable for use in photography.

Figure 3:
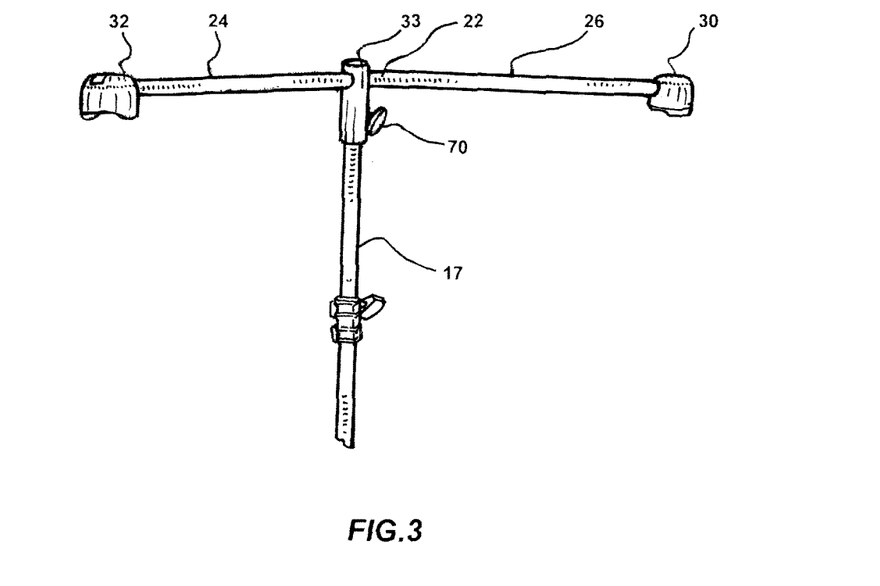
FIG. 3 is a close-up perspective view of an upper portion of a stand that forms part of the photographic background assembly of FIG. 1.

The stand comprises a base 15, an upright support member 17 extending upwardly from the base 15, and a background mounting member 18 mounted to the upper end of the upright support member 17 by a stand receiver 33. The upright support member 17 is telescopic in form, which a plurality of tubular elements, which are held in position relative to each other by a series of collars and fasteners.

The base 15 of the stand 14 comprises three legs, each of which has an intermediate portion that is hingedly mounted, via struts, to the lower end of the upright support member 17, and an upper portion that is fixed to a slidable support ring mounted about the upright support member 17. The legs may therefore be moved between a folded configuration, in which the legs lie alongside the upright support member 17, and an assembled configuration, in which the legs extend outwardly, and downwardly, from the upright support member 17.

Figure 4:
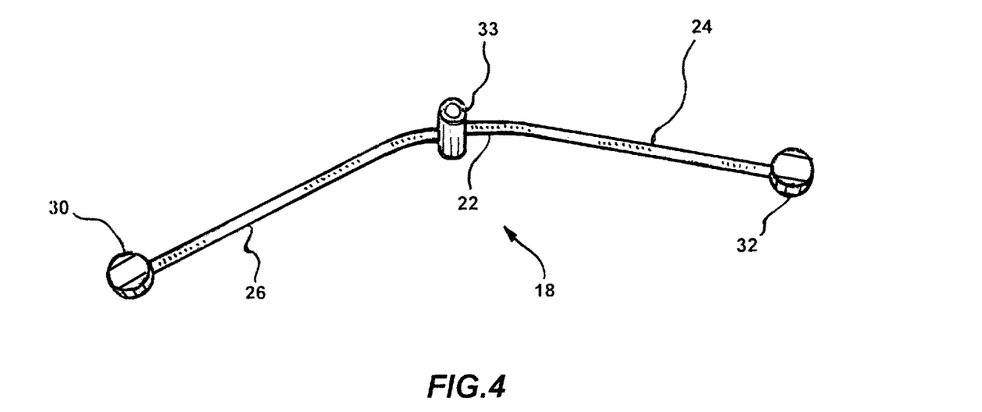
FIG. 4 is a perspective view of a background mounting member that forms part of the photographic background assembly of FIG. 1.
Figure 6:
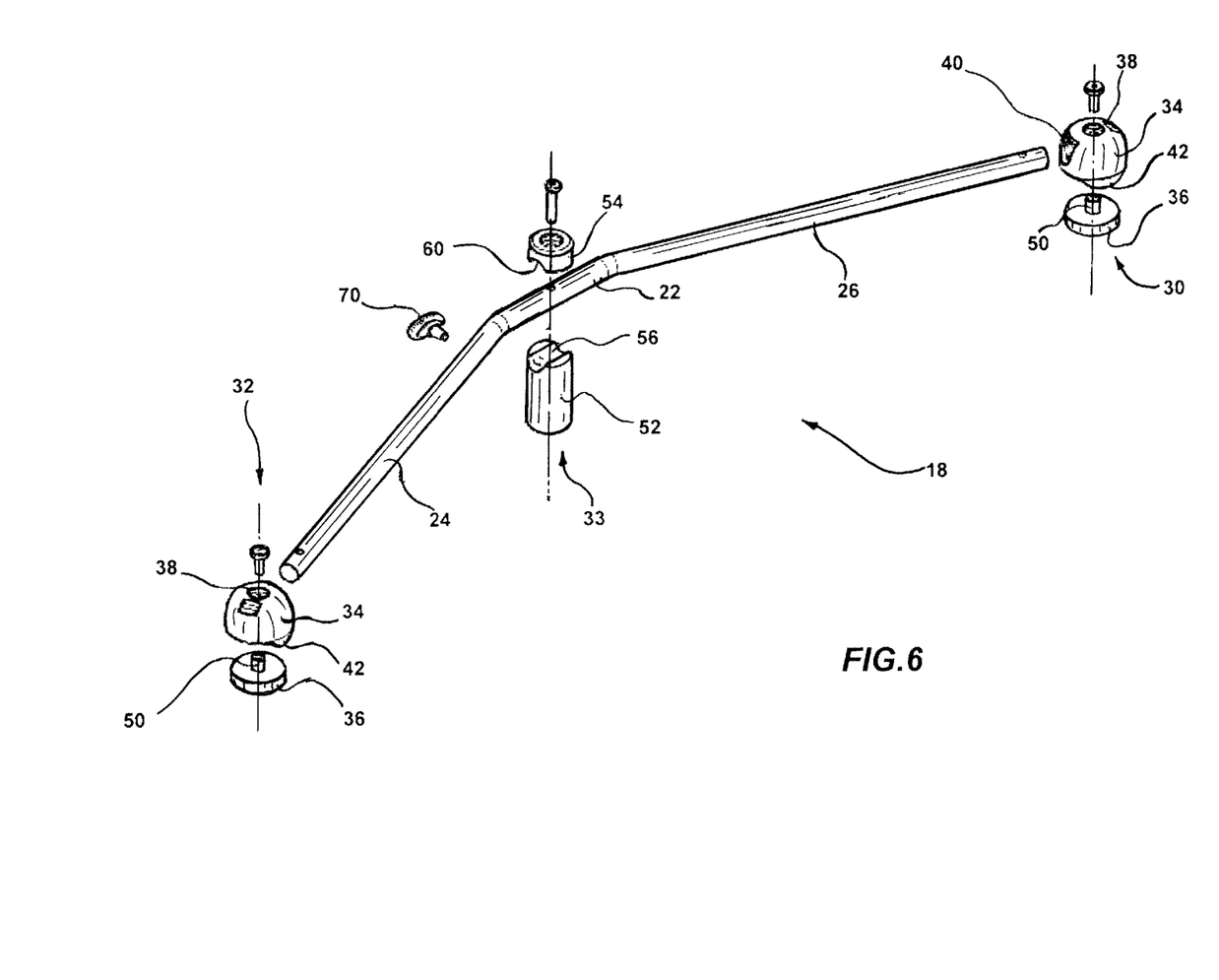
FIG. 6 is an exploded perspective view of the background mounting member of FIG. 4.

The background mounting member 18 comprises a central portion 22 and a plurality of arm-like portions 24,26. The arm-like portions 24,26 are obliquely angled relative to the central portion 22. The central portion 22 comprises a through hole, located at the centre of the central portion. Each of the plurality of arm-like portions comprises a through-hole, which is located at a distal end of the arm-like portion 24,26.

Figure 5:
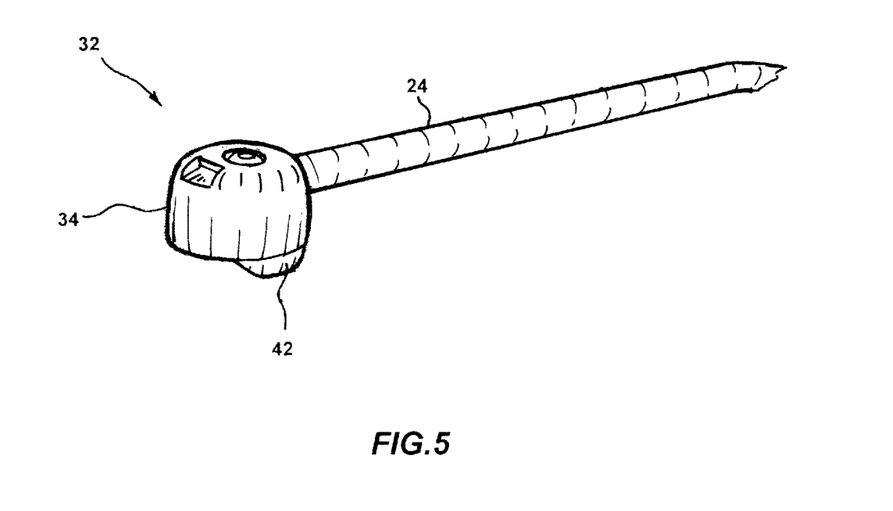
FIG. 5 is a close-up perspective view of an end portion of the background mounting member of FIG. 4.

The background mounting member 18 comprises a plurality of magnetic receiving formations 30,32 and a stand receiver 33. Each of the plurality of magnetic receiving formations 30,32 is located at a distal end of an arm-like portion 24,26. Each of the plurality of magnetic receiving formations 30,32 comprises a magnet housing portion 34, and a magnet 36. The magnet housing portion 34 is substantially dome-like in form. The magnet housing portion 34 further comprises a through-hole 38, an aperture 40, and a guiding formation 42. The through-hole 38 is substantially cylindrical in form, and extends from an upper surface of the magnet housing portion 34 to a lower surface of the magnet housing portion 34.

The aperture 40 is substantially circular in form, and is disposed on a side surface of the magnet housing portion 34. The aperture 40 is in communication with the interior of the magnet housing portion 34, and thus is in communication with the through-hole 38. The aperture 40 has substantially the same dimensions as a distal end of an arm-like portion 24,26 of the background mounting member 18, and is thus able to receive an arm-like portion 24,26 of the background mounting member 18 during use.

The guiding formation 42 comprises a plurality of walls. Each of the plurality of walls are substantially linear in form, and depend downwardly from a lower edge of the magnet housing portion 34. Each of the plurality of walls are disposed on opposing sides of the lower edge of the magnet housing portion 34, such that the plurality of walls define a channel. The width of the channel is such that it is able to accommodate the semi-rigid frame 16 of the collapsible background unit 12 during use.

The magnet 36 has a substantially circular cross-section, and is substantially cylindrical in form. The dimensions of the magnet 36 are such that it may be received within the magnet housing portion 34 with a close fit. The magnet 36 comprises a screw receiving formation 50. The screw receiving formation 50 is located upon an upper surface of the magnet 36, and takes the form of an upstanding hollow cylinder. The diameter of the screw receiving formation 50 is substantially the same as the diameter of the through-hole 38 of the magnet housing portion 34. The interior surface of the screw receiving formation 50 comprises a thread, such that a corresponding screw may be engaged during use.

The stand receiver 33 comprises first 52 and second 54 portions. The first portion 52 is substantially cylindrical in form, and has a substantially hollow interior and a substantially open lower surface. An upper surface of the first portion comprises a recess 56. The recess 56 has a substantially semi-circular cross-section, and extends across substantially the entirety of the upper surface of the first portion 52. The recess 56 comprises a threaded aperture, which is located at a centre point of the recess 56. The recess 56 has substantially the same radius as the central portion 22 of the background mounting member 14, such that the first portion 52 of the stand receiver 33 may engage the background mounting member 14 during assembly.

The second portion 54 is substantially cylindrical in form. A lower surface of the second portion 54 comprises a recess 60. The recess 60 has a substantially semi-circular cross-section, and extends across substantially the entirety of the lower surface of the second portion. The recess 60 has substantially the same radius as the central portion 22 of the background mounting member 14, such that the second portion 54 of the stand receiver 33 may engage the background mounting member 14 during use. The second portion 56 comprises a threaded through-hole. The threaded through-hole extends from an upper surface of the second portion 56 to a lower surface of the second portion 56.

The stand receiver 33 further comprises a locking mechanism 66. The locking mechanism 66 comprises an aperture and a key 70. The aperture is disposed upon a side surface of the first portion 54 of the stand receiver 33. The aperture 68 is substantially circular in form, and is provided with a thread. The aperture 68 is dimensioned so as to engage a corresponding portion of the key 70.

The key 70 comprises an engagement portion and a graspable portion. The engagement portion is substantially cylindrical in form, and is provided with a thread along its length. The engagement portion has substantially the same diameter as the aperture. The graspable portion is substantially elliptical in form, and extends perpendicularly outwardly from an end of the engagement portion, such that the key 70 may be grasped by a user during use.

The distal ends of the arm-like portions 24,26 of the background mounting member 14 are received within corresponding apertures 40 of the magnet housing portions 34 of the magnetic receiving formations 30,32. Magnets 36 are located within the interior of the magnet housing portion 34 such that the through-hole 38 of the magnet housing portion 34, the through-hole 28 of the arm-like portion 24,26, and the screw receiving formation 50 of the magnet 36, are in alignment. A screw extends through the through-hole 38 of the magnet housing portion, and is received with the screw receiving formation 50 of the magnet 36, such that the magnetic receiving formations 30,32 are retained on the arm-like portions 24,26 of the background mounting member 18.

The threaded aperture 58 of the first portion 54 of the stand receiver 33, the threaded through-hole 62 of the second portion 56 of the stand receiver, and the through-hole 28 of the central portion 22 of the background mounting member, are aligned, such that a screw attaches the stand receiver 33 to the central portion 22 of the background mounting member 18.

The photographic background assembly may be assembled by erecting the stand 14, including extending the telescopic upright support member 17 to the desired height, and then fastening the background mounting member 18 to the upper end of the upright support member 17.

The collapsible background unit 12 is then formed by unfolding the loops from the collapsed configuration, and allowing the semi-rigid frame to resiliently reform into a single hoop. The semi-rigid frame 16 of the collapsible background unit 12, may then be located within the channels of the magnetic receiving formations 30, 32 of the background mounting member 18, such that the magnets 36 engage with the semi-rigid frame 16. The collapsible background unit 12 will then be suspended from the background mounting member 18, in the configuration shown in FIG. 1. The collapsible background unit 12 is selectively attachable to the background mounting member 18, such that it may be replaced with other suitable background units.

The photographic background assembly may be collapsed by firstly detaching the semi-rigid frame 16 from the magnetic receiving portions 30,32 of the background mounting member 18, and then collapsing the collapsible background unit 12. The collapsible background unit 12 may be collapsed by the user grasping opposite sides of the semi-rigid frame 16, twisting the semi-rigid frame 16 to form loops, and then folding those loops over, such that the loops lie adjacent to each other, and then repeating where possible. The collapsible background unit 12 may then be stored in a pouch or other receptacle until it is next required.

The background mounting member 18 may then be dismounted from the upright support member 17 of the stand 14. The upright support member 17 and the base 15 of the stand may then be retracted into their collapsed configurations.

The invention claimed is:

1. A photographic background assembly, the assembly comprising a collapsible background unit having a semi-rigid frame, and a background mounting member, wherein the collapsible background unit comprises a magnetic portion, and wherein the background mounting member comprises at least one magnetic receiving formation configured to engage the magnetic portion of the collapsible background unit, such that the collapsible background unit is selectively attachable to the background mounting member by the magnetic portion so as to provide a background for use in photography, wherein the collapsible background unit comprises a flexible sheet portion, within the semi-rigid frame, which is more flexible than the semi-rigid frame and wherein the flexible sheet portion is formed of an elastic material, which is held in tension by the semi-rigid frame, wherein the photographic background assembly has one or more background mounting members adapted to be selectively attachable to an upper portion of the collapsible background unit, such that the collapsible background unit is suspended from that upper portion when the photographic background assembly is assembled.

2. The photographic background assembly as claimed in claim 1, wherein the collapsible background unit has the form of a generally planar panel.

3. The photographic background assembly as claimed in claim 1, wherein the semi-rigid frame has the form of a resilient hoop.

4. The photographic background assembly as claimed in claim 1, wherein the semi-rigid frame has the form of a resilient band of material, and the collapsible background unit is configured to be collapsed by a user grasping opposite sides of the semi-rigid frame, twisting the semi-rigid frame to form loops, and then folding those loops over, such that the loops lie adjacent to each other, and then repeating where possible.

5. The photographic background assembly as claimed in claim 1, wherein the magnetic portion of the collapsible background unit is formed by at least one portion of the semi-rigid frame of the collapsible background unit.

6. The photographic background assembly as claimed in claim 5, wherein the semi-rigid frame is formed of at least one member, at least one of which is formed of a magnetic material.

7. The photographic background assembly as claimed in claim 1, wherein the magnetic portion of the collapsible background unit has an engagement surface shaped to mate with an engagement surface of the at least one magnetic receiving formation.

8. The photographic background assembly as claimed in claim 1, wherein the background mounting member forms part of a self-supporting stand, the stand comprising one or more members that are movable relative to each other, being either hingedly or telescopically mounted relative to each other, such that the stand is collapsible.

9. The photographic background assembly as claimed in claim 1, wherein the background mounting member is disposed in the proximity of an upper end of a self-supporting stand, the at least one magnetic receiving formation of the background mounting member being orientated to receive the magnetic portion of the collapsible background unit from below.

10. The photographic background assembly as claimed in claim 1, wherein the at least one magnetic receiving formation of the background mounting member comprises one or more permanent magnets.

11. The photographic background assembly as claimed in claim 1, wherein the background mounting member includes guide surfaces, which guide the magnetic portion of the collapsible background unit into engagement with the at least one magnetic receiving formation of the background mounting member.

12. The photographic background assembly as claimed in claim 1, wherein the background mounting member includes retaining formations, which resist movement of the collapsible background unit by non-magnetic means, when attached to the background mounting member, in at least one dimension.

13. The photographic background assembly as claimed in claim 1, wherein the at least one magnetic receiving formation of the background mounting member suspends the collapsible background unit, with retaining formations of the background mounting member resisting lateral movement.

14. The photographic background assembly as claimed in claim 11, wherein the guide surfaces and/or the retaining formations are formed by at least one housing for the at least one magnetic receiving formation.

15. The photographic background assembly as claimed in claim 11, wherein the guide surfaces and/or the retaining formations define a channel, with open ends and inclined side surfaces, which receive an elongate magnetic portion of the collapsible background unit.

\* \* \* \* \*